(12) United States Patent
Branson et al.

(10) Patent No.: US 7,830,578 B2
(45) Date of Patent: Nov. 9, 2010

(54) APPARATUS FOR ELECTRONICALLY CONTROLLED HOLOGRAMS

(76) Inventors: Jeremy Branson, 7313 Scarborough St., Springfield, VA (US) 22153; Richard L. Garwin, 16 Ridgecrest East, Scarsdale, NY (US) 10583-2012

( * ) Notice: Subject to any disclaimer, the term of this patent is extended or adjusted under 35 U.S.C. 154(b) by 23 days.

(21) Appl. No.: 12/186,190

(22) Filed: Aug. 5, 2008

(65) Prior Publication Data
US 2009/0195857 A1    Aug. 6, 2009

Related U.S. Application Data

(62) Division of application No. 11/248,093, filed on Oct. 12, 2005, now abandoned.

(51) Int. Cl.
*G02B 26/00*   (2006.01)
*G02F 1/01*    (2006.01)

(52) U.S. Cl. .......... 359/238; 359/245; 359/290
(58) Field of Classification Search .......... 359/237, 359/238, 276, 279, 290, 291, 295, 846, 849, 359/245; 349/113
See application file for complete search history.

(56) References Cited

U.S. PATENT DOCUMENTS

| | | | | |
|---|---|---|---|---|
| 7,227,687 B1* | 6/2007 | Trisnadi et al. | ............. | 359/559 |
| 7,400,382 B2* | 7/2008 | Baba-Ali et al. | ............. | 355/67 |
| 2005/0068599 A1* | 3/2005 | Mushika | ............. | 359/237 |

* cited by examiner

*Primary Examiner*—Alessandro Amari
(74) *Attorney, Agent, or Firm*—Rodney T Hodgson

(57) ABSTRACT

A complex micromirror or LCD array device that performs complex optical or electro-optical transforms is described. Both real and imaginary parts of a light beam are modulated in amplitude to give a spatially and temporally modulated beam.

10 Claims, 8 Drawing Sheets

| 0° | 0° | 0° | 90° | 90° | 90° |
|---|---|---|---|---|---|
| 0° | 90° | 0° | 90° | 90° | 0° |
| 0° | 90° | 0° | 90° | 90° | 90° |
| 90° | 90° | 0° | 0° | 90° | 0° |
| 0° | 0° | 0° | 0° | 90° | 0° |
| 90° | 90° | 0° | 0° | 0° | 0° |
| 0° | 90° | 90° | 0° | 0° | 90° |

FIG 15

| 0° | 270° | 0° | 270° | 0° | 270° |
|---|---|---|---|---|---|
| 90° | 180° | 90° | 180° | 90° | 180° |
| 0° | 270° | 0° | 270° | 0° | 270° |
| 90° | 180° | 90° | 180° | 90° | 180° |
| 0° | 270° | 0° | 270° | 0° | 270° |
| 90° | 180° | 90° | 180° | 90° | 180° |
| 0° | 270° | 0° | 270° | 0° | 270° |
| 90° | 180° | 90° | 180° | 90° | 180° |

APPARATUS FOR ELECTRONICALLY CONTROLLED HOLOGRAMS

This application is a division of application Ser. No. 11/248,093, field Oct. 12, 2005, now abandoned.

FIELD OF INVENTION

This invention relates generally to the fields of complex Spatial Light Modulators (SLM's) and optical computing; more particularly it relates to the field of complex transform generation using reflective or transmissive spatial light modulation.

BACKGROUND OF THE INVENTION

Spatial light modulators (SLM's) have many uses including but not limited to projection, holography, optical switching, and optical computing.

SLM's maybe static or temporal. SLM's come in a wide variety of types including film based, liquid crystal device (LCD) based, and micro-electro-mechanical (MEM's) based. A diffraction grating is a simple example of a static SLM; a holographic lens or hologram is a less simple example. FIG. 1 shows a sketch of a plane wave light beam (or parallel light beam) 10 having flat planes of equal phase shown by lines 12 incident on a transmission diffraction grating 14. Light is diffracted from diffraction grating 14, and two orders of diffraction 16 and 18 are shown. The parallel light beam 10 can be considered a beam of light uniform in space and in time having only one of the two parts which make up a more complex beam. By convention, we call the two parts of the light beam the "real" and the "imaginary" part, since in the mathematical representation of the light fields the two parts are described by a real number and an imaginary number, and in graphical representations the light field is represented by a vector in the two dimensional complex plane which has a "real" axis and an "imaginary" axis. The vector has two components, a "real" component and an "imaginary" component. The amplitude of the electric field vector of the light wave is given by the length of the vector, and the phase of the light field by the angle which the vector makes with, by convention, the "real axis". The phase of the light field is given in degrees (from 0 to 360 degrees) or by radians (from 0 to $2\pi$ radians). By choice, we call the light beam 10 a beam having only a real component. The real component is spatially modulated by letting only certain spatial components through the transmission grating, and the spatial modulation of the real part of the light beam 10 produces diffracted light in various orders, of which only two are shown.

FIG. 2 shows a more complicated thick film hologram 24 where most of the incoming light 10 is thrown in one diffraction order 28. The surfaces of equal phase are shown as more complicated surfaces than planes, and the information contained in the thick film hologram is carried in the outgoing wave. The hologram 24 produces an output wave 28 which has both real and imaginary parts, and both the real and imaginary parts may have spatial modulation. The production of such holograms 24 is well known to one of skill in the holographic art, and the resultant holographic reconstructions of the original complicated optical signal have been on view since the 1960's. The diffraction grating of FIG. 1 can be thought of as a simple hologram, where a light wave having only a real component incident generates a light wave also having only a real component. The reconstructed light wave signals shown in FIGS. 1 and 2, however, are static and do not change in time.

While there are many different types of temporal SLM's, they can loosely be divided into two categories, transmissive and reflective. Transmissive SLM's are exemplified by Liquid Crystal Display (LCD) SLM's such as are found in the screens of most laptop computers. An example of an LCD SLM is made by Boulder Nonlinear Systems. LCD SLM's can be filled with various liquid crystal types and topologies to spatially and temporally modulate amplitude of a light beam. These types of devices carry with them the drawbacks of state of the art LCD's including limited contrast ratios and limited switching speeds.

Reflective SLM's are exemplified by arrays of micromirrors. An example of a micromirror SLM is made by Texas Instruments. The micromirrors can be made to adjust their positions and/or angles to modulate the amplitude of portions of a light beam. LCD's can be operated in a reflective mode where the light passes twice through the liquid crystal material. Such LCD SLM's are exemplified by liquid crystal on silicon (LCOS) devices used in front and back projection systems.

The current state of the art of Micromirrors is in a constant state of improvement and the edge of the curve is difficult to characterize. A micromirror array can be as simple as a prior art array of static mirrors fabricated on an absorbing substrate using standard MEMs techniques. A hologram can be displayed, for example, by an array having pattern of missing mirrors. Such holograms are equivalent to the diffraction grating of FIG. 1 which modulate only one component of the light beam, and which are called "thin film holograms"

It is useful, of course, if the mirrors can be made to turn on and off to modify the light beam temporally. One way to do this is to tilt the mirrors of the array. In the "on" state, mirrors reflect light into the target or a lens to be projected on to a target. In the "off" state, mirrors are tilted to throw away light into a direction other than the target, generally to an absorber to absorb the light and prevent stray light. An example of the technology is the Texas Instruments Digital Light Processor (DLP) micro mirror Array. One of their very successful products employs square mirrors of 16 microns on a side, spaced 17 microns apart. During the last year, the standard mirror size has been reduced to 14 microns, indicating that the industry is continuing to shrink mirror size and continue general developmental progress. The type of contribution made by the light reflected by an individual mirror can depend on the application.

When used in a lensed projection system, for example, each mirror will reflect a small amount of light that corresponds to a single pixel in the spatial domain in the same way that a single light valve corresponds to a single pixel in a LCD display. In the "on" state, a mirror reflects light into the projection screen. In the "off" state, the mirror is tilted to throw away its light into a direction other than the projection screen. This can be considered a form of magnitude-only amplitude modulation in the spatial domain.

OBJECTS OF THE INVENTION

It is the object of the invention to provide a spatial light modulator capable of effecting a complex transform of a beam of light.

It is also the object of the invention to provide a spatial light modulator capable of effecting a phase transformation equivalent to or approximating a complex transform.

It is also the object of the invention to provide asymmetric modulation by means of a spatial light modulator.

It is also the object of the invention to provide a means of generating asymmetric holographic images.

It is also the object of the invention to provide a means of generating temporal holographic images.

It is also the object of the invention to provide a means of generating asymmetric temporal holographic images.

SUMMARY OF THE INVENTION

Real and imaginary parts of an output light beam are produced by spatially separating an input light beam into a large plurality of interspersed output light beams, wherein each of the interspersed light beams has one of at least two phases fixed with respect to the phases of each of the other interspersed light and beams. The amplitude only of each of the large plurality of fixed phase output lightbeams is controlled by a controller. The large plurality of controlled amplitude fixed phase output light beams combine to produce an output beam wherein the amplitude of the real and imaginary parts of the output light beam are controlled in a spatially and time resolved manner.

BRIEF DESCRIPTION OF THE DRAWINGS

FIG. 15 shows a sketch of a random or pseudo random arrangement of phase delays.

FIG. 16 shows a sketch of an arrangement of phase delays.

DETAILED DESCRIPTION OF THE INVENTION

The inventors have realized that prior art attempts to produce spatially and temporally resolved SLM's have attempted to adjust the phase of the light reflecting from adjustable mirrors, where moving the mirror changes the phase of the reflected light, and thus rotates the vector representing the light field in the imaginary plane. In addition, the amplitude of the light field may also be changed.

The inventors have realized that it is very much easier to temporally modulate the magnitude of a light field with fixed phase than to temporally modulate the phase of a light field with fixed amplitude.

Thus, the inventors have divided the light beam into a large plurality of light beams, each of which has a fixed phase difference with respect to each of the other light beams. For the the purposes of this specification, a large plurality of light beams is defined as more than 100 light beams. More preferably, a large plurality of light beams is defined as more than 1000 light beams. Most preferably, a large plurality of light beams is defined as more than 100,000 light beams. Preferably, two phases are chosen for the different phases, but three or more phases are more preferable. Most preferably, 4 phases are chosen for the number of fixed phases of the interspersed light beams.

A number of such fixed phase interspersed light beams now have their amplitudes modulated by a controller. The light field resulting from the combination of the modulated interspersed light beams is now a light field modulated in both amplitude and phase. A large number of such groups of interspersed light beams is used to project a holographic image or for other applications as will be obvious to one of skill in the art of manipulation of light.

Figure 1:
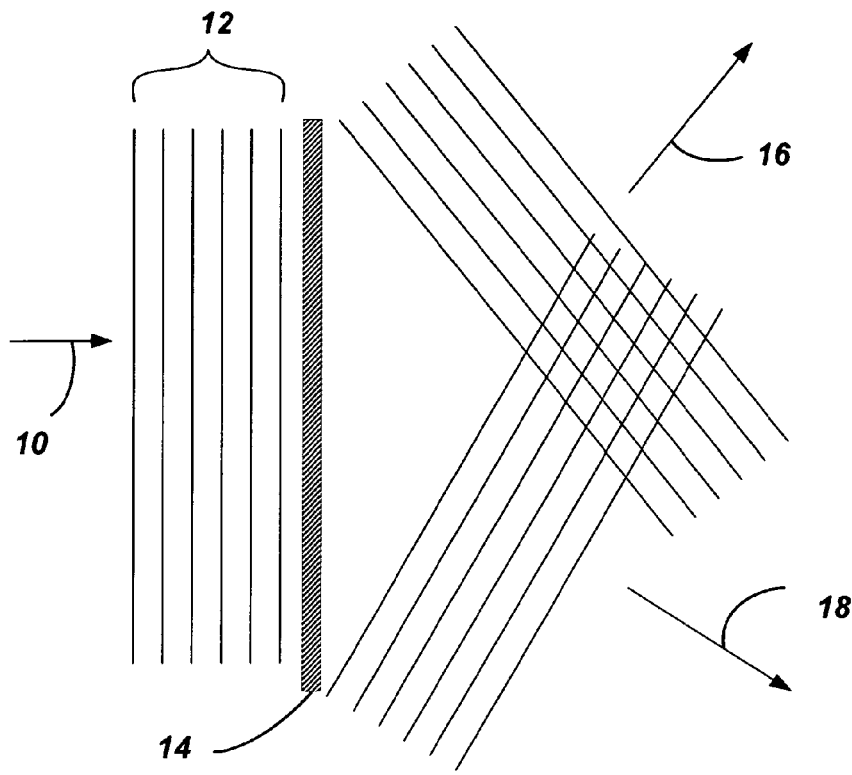
FIG. 1 shows a sketch of use of a prior art transmission grating.
Figure 2:
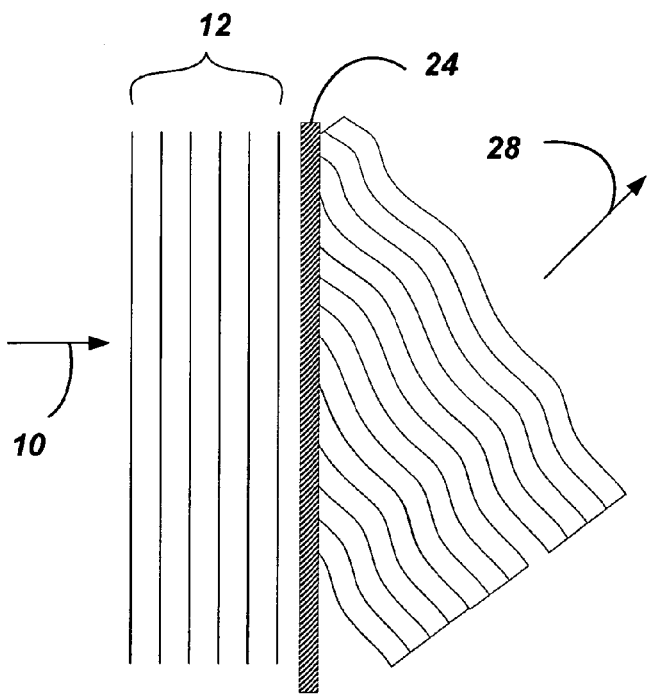
FIG. 2 shows a sketch of a use of prior art hologram.
Figure 3:
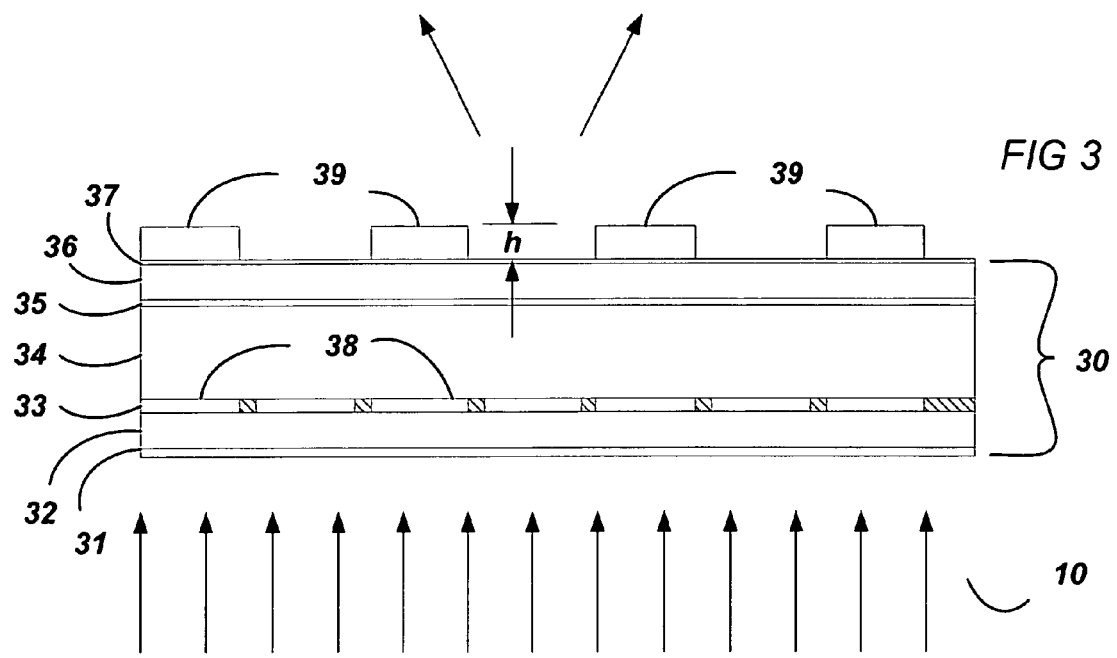
FIG. 3 shows a sketch of an embodiment of the invention.

FIG. 3 shows an embodiment of an apparatus of the invention. An input light beam 10 having wavelength $\lambda$ is shown impinging on a prior art LCD device 30. Again, by convention, we say that light beam 10 has only a real component. A polarizer 31 lets light of one polarization through a transparent support structure 32. A layer 33 has transparent electrodes 38, each of which is separately addressable to impress an electric field across a liquid crystal material 34. A transparent electrode 35 cooperates with electrodes 38 in impressing the spatially resolved electric field across the liquid crystal material 34. Support structure 36 and polarizer 37 complete the prior art device. Not shown are other layers which are well known to those skilled in the art of LCD devices, and which are involved in structuring the liquid crystal material. If light beam 10 is polarized correctly, polarizing layer 31 is optional. The LCD device 30 acts as a controller to control the amplitude of portions of input light beam 10 which pass through electrodes 38. The present invention is exemplified by the addition of phase retarding materials 39, which are registered and aligned with respect to some of the electrodes 38. If all the electrodes 38 are set to transmit light from the input light beam 10, the phase retarding material 39 turns the input light beam 10 into a large plurality of output light sources, each of which has one of two phases with respect to the other output light sources of the large plurality of output light sources. Each of the large plurality output light sources produces an fixed phase output light beam which diffracts and diverges from the source. The intensity and amplitude, but not the phase, of each of the fixed phase output light beams is controlled by the LCD device 30. The large plurality of fixed phase output light beams interfere and interact to produce an output light beam which has both real and imaginary parts, and wherein the amplitude control of the large plurality of output light beams allows the both the imaginary and real parts of the complex output beam to vary in both space and time.

Preferably, the two phase differences are 0 and approximately 90 degrees. If the index of refraction of the materials 39 is n for a given wavelength, the height h should be equal to $\lambda/4$ (n−1). n varies slightly with wavelength, but the height h of the materials 39 determines the retardation to first order. The apparatus of FIG. 3 thus produces a large plurality of interspersed output light beams, each of which is either real or imaginary, and each of which can be amplitude modulated by controlling voltages across the liquid crystal material 34. The combination of light transmitted through one 0 degree electrode and a neighboring 90 degree electrode can be considered light from a single pixel.

If light of a different wavelength than the design wavelength is used, there will still be a significant imaginary component of light transmitted in the interspersed light beams, and by adjusting the transmission of the LCD device 30, both imaginary and real components of the resultant beam can be controlled by appropriate control of the electrodes 38. For example, if the design wavelength $\lambda$ is used, so that the interspersed light beams have phases of 0 degrees and 90 degrees, and a resultant beam with phase 45 degrees is required, the amplitude of the 0 degree beams and the 90 degree beams will be set equal. If, however, a different wavelength is used so that the phases of the component beams are 0 degrees and 80 degrees (for example), the 0 degree beam will be attenuated more by a calculated amount than the 80 degree beam to bring the resultant phase angle to 45 degrees. In this example for a two phase system, the phase of the combined output is a function only of the ratio of the amplitudes. The amplitude of the combined output can vary from zero (for both phases attenuated, to 1 , for only one phase turned on, to $2^{1/2}$ for both phase turned on at maximum amplitude for the 0 and 90 degree case. The LCD device allows fine control of the transmission through any set of two electrodes 38, thus any phase between 0 and 90 degrees and any amplitude (over a defined range) of the resultant beam formed by the combination of two phases is possible. The apparatus of FIG. 3 is thus suitable for controlling light having wavelength significantly different from the design wavelength $\lambda$, and can indeed be used to provide temporally and spatially varying color holograms by providing sequential color inputs and sequentially changing amplitudes for each of the interspersed beams.

Figure 4:
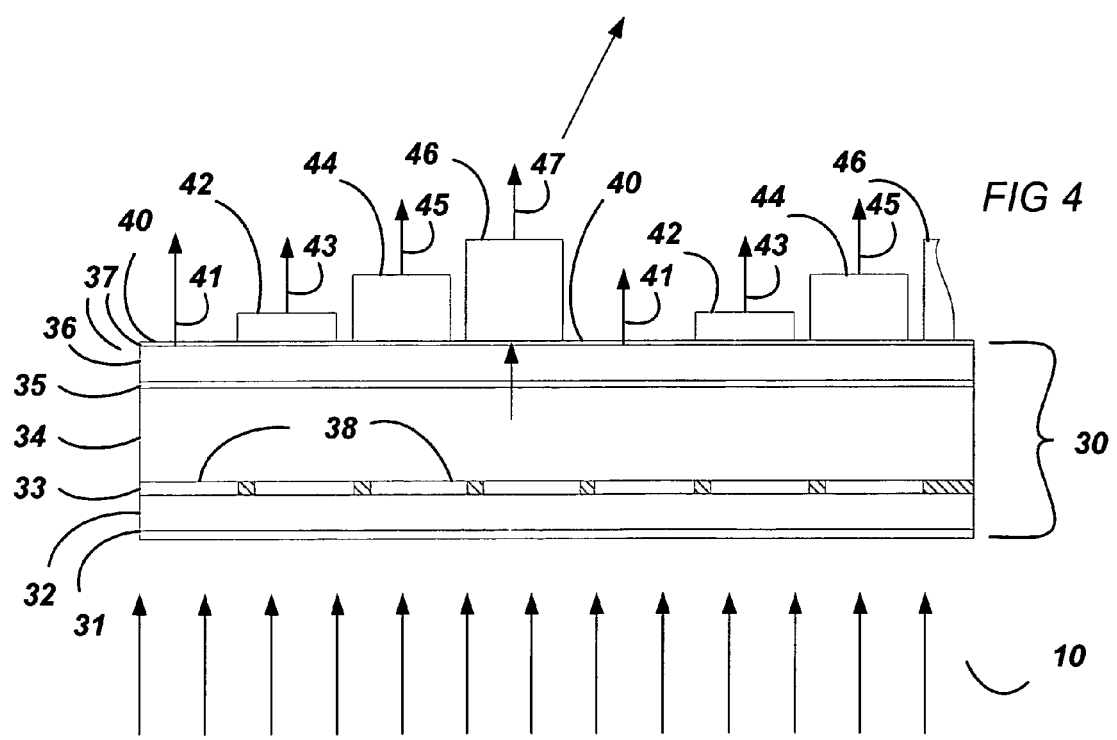
FIG. 4 shows a sketch of an embodiment of the invention.

FIG. 3 shows a preferred device for temporally and spatially controlling both real and imaginary components of a light beam. However, better control the light beam can be achieved by using more phases of the light beam, especially if the control is a digital control with individual light beams either on or off. FIG. 4 shows a more preferably scheme than FIG. 3, in that multiple heights of material such as material 39 are used to retard various portions of light beam 10. As before, a thickness h of material 42 is used to retard one set of light beams 43 by 90 degrees, and further thicknesses 2 h at 44 and 3 h at 46 of the material are used to give retardations of 180 and 270 degrees for light beams 45 and 47 with respect to light beams 41 exiting through positions 40 which have no phase shifting material added. While three phases of light are more preferable than two, 4 phases are even more preferred, and are available with only one more lithography step (for lithographically produced height variations) than used for the two phase set up of FIG. 3.

Figure 5:
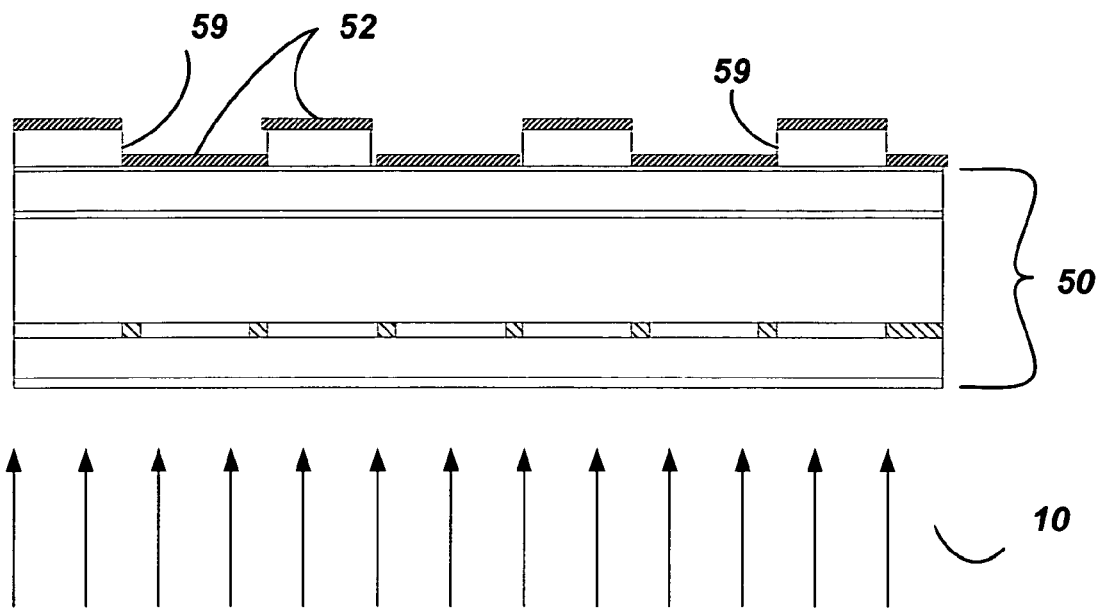
FIG. 5 shows a sketch of an embodiment of the invention.

FIG. 5 shows a device using an LCD in a reflection mode. Light beam 10 now makes two passes through the LC material and the phase retarding material 59 which is covered over with reflecting material 52, which is now required to be only half as thick as the material of FIG. 3 for the same phase retardation. Changes to the LCD device 50 to make it work as a reflection device are well known to those of skill in the art of LCD devices. A more preferred reflection LCD device has three different thicknesses of phase retarding material in analogy with FIG. 4, which gives interspersed beams having 4 different phases.

Figure 6:
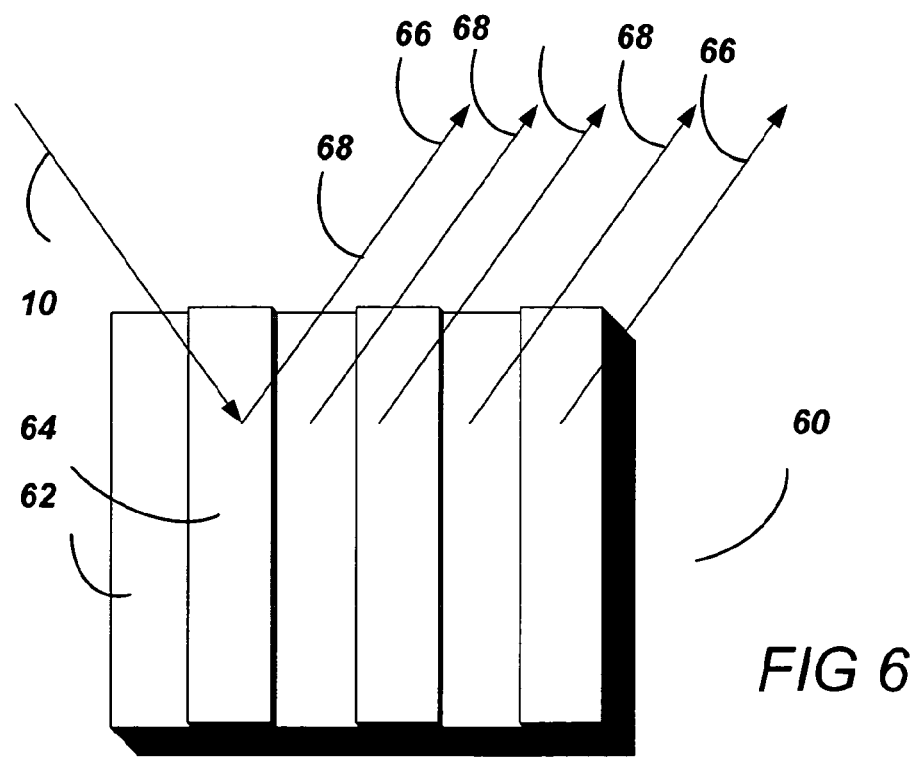
FIG. 6 shows a sketch of a device for separation of phases.

FIGS. 3 through 5 show embodiments of the invention where the phase changing elements of the invention are attached to the amplitude modulating elements of the invention. The inventors anticipate that these elements may be separated in space as using an element as shown in FIG. 6. FIG. 6 shows a substrate 60 having a reflecting surface 62. One dimensional grooves 64 are shown formed in surface 62, where the grooves have depth of $\lambda/8$, A light wave 10 having wavelength $\lambda$ incident on surface 62 will produce a large plurality of light beams 66 and 68, each of which has a fixed phase difference with respect to each other light beam, where the phase difference will be 90 degrees or zero. The device of FIG. 6 will move the resultant light beam in one dimension and may be used, for example, as an optical router.

Figure 7:
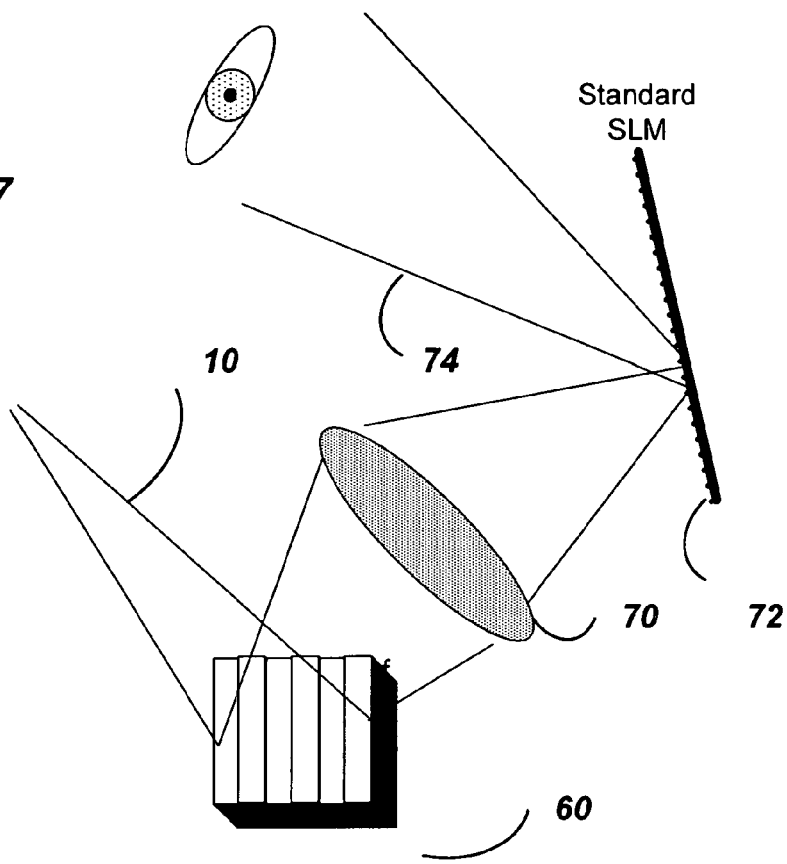
FIG. 7 shows a sketch of an embodiment of the invention.

The element of FIG. 6 is then used in an optical system such as sketched by FIG. 7. Light 10 is incident on element 60 and the reflected light beams 66 and 68 are collected by lens 70 and sent to a standard SLM 72 . . . in the case shown a reflecting SLM. The grooves 64 are imaged on corresponding pixels of the SLM 72, which amplitude modulates the interspersed light beams 66 and 68 focused on the pixel controllers of SLM 72, and produce a light beam 74 where the real and imaginary parts of light beam 74 are separately amplitude modulated. The reflective device of FIG. 6 could equally well be a transmissive device where phase shifting is accomplished using different paths lengths in a material of index of refraction greater than 1. The device of FIG. 6 will move the resultant light beam in one dimension and may be used, for example, as an optical router. The element shown in FIG. 7 used to break the light beam 10 into a large plurality of light beams having different phases is also anticipated to have a two dimensional pattern which is matched optically to a two dimensional pattern of SLM 72.

Figure 8:
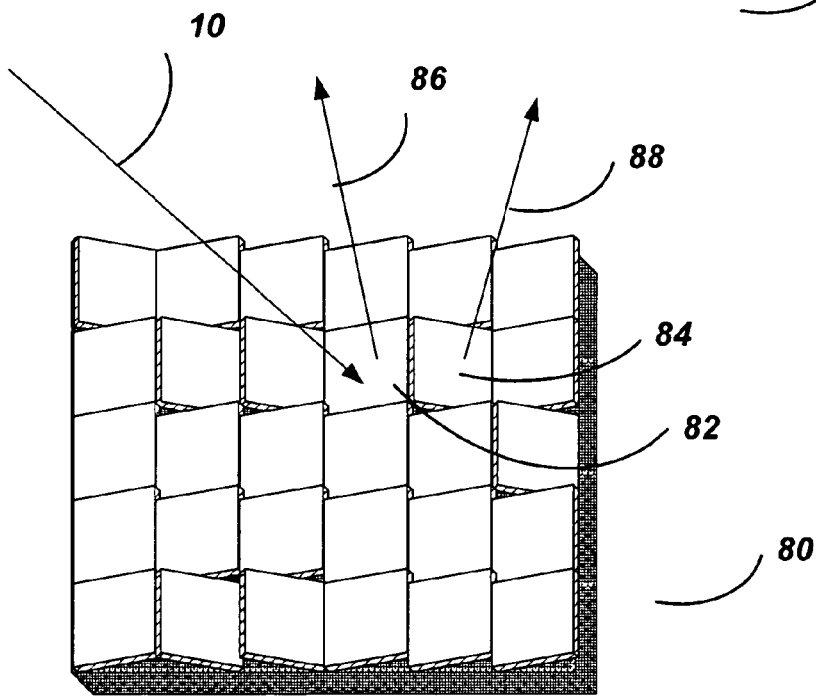
FIG. 8 shows a sketch of a prior art micromirror device.

FIG. 8 shows a prior art SLM light controller micromirror device 80. Micromirrors 82 and 84 are shown tilted at different angles to throw light 10 incident on the SLM micromirror device 80 into one of two directions 86 and 88. The micromirror device 80 controls the amplitude of a large number of light beams. The amplitude of each of the large number of light beams is either zero or one, by convention.

When used in a lensless holographic display, for example, each mirror 82 and 84 reflects small amount of light in the same way that an area in a film hologram which is unexposed, developed, and fixed transmits a small amount of coherent light in a film hologram. In the "on" state, a mirror reflects light into the target. In the "off" state, the mirror is tilted to throw away its light into a direction other than the target in the same way that the exposed, developed, and fixed film absorbs the light. This special case can also be considered a form of real-only amplitude modulation. Like a standard thin film hologram, the collection of mirrors necessarily forms at least two images, one of the plus 1 order and one of the minus 1 order Unlike standard holograms, however, the mirrors can turn on and off to form moving and changing images.

Figure 9:
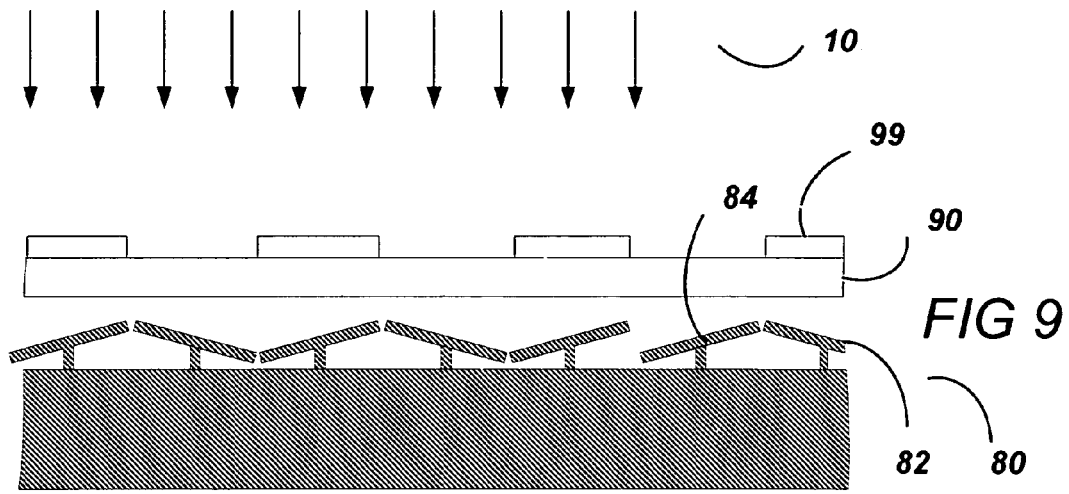
FIG. 9 shows a sketch of an embodiment of the invention.

FIG. 9 shows a sketch of a preferred embodiment of the invention in a cross sectional view of device 80 having a transparent cover 90 with attached transparent material 99 registered with respect to the underlying micromirrors 82 and 84. Light beam 10 incident on the material 99 will be transmitted through material 99 and the cover plate 90 to strike an underlying mirror, and will be reflected back through material 99 to form a light beam interspersed with light beams reflected without passing through material 99. If the thickness of material 99 is correctly chosen, the reflected light beam will have a phase shift of approximately 90 degrees with respect to its neighboring light beams which did not pass through the material 99, in analogy with the sketch of FIG. 5.

Figure 10:
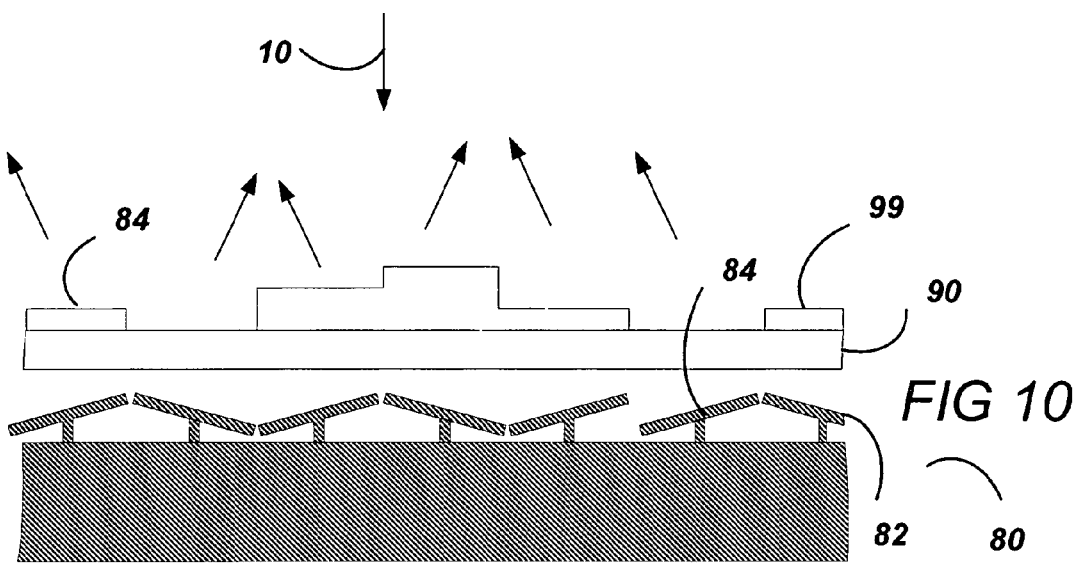
FIG. 10 shows a sketch of an embodiment of the invention.

In analogy with FIG. 4, FIG. 10 shows a preferred embodiment of the invention, where three thicknesses of transparent material matched to the underlying micromirrors is arranged to give 4 phases of interspersed light beams. Each of the interspersed light beams are amplitude modulated by switching the mirrors to throw light into 102 or away 104 from an optical system (not shown).

Figure 11:
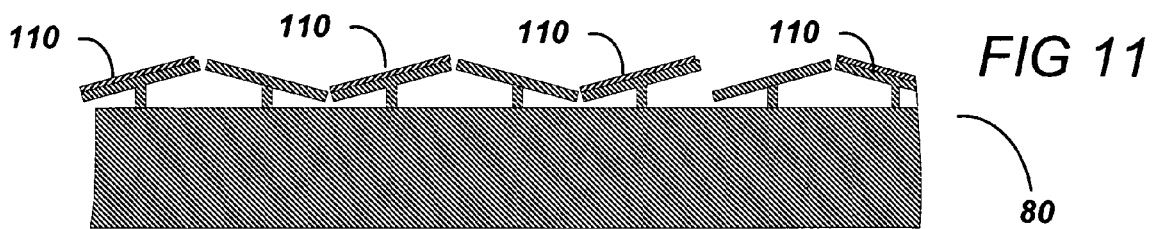
FIG. 11 shows a sketch of an embodiment of the invention.

FIG. 11 shows a preferred embodiment of the invention, where some of the micromirrors have material 110 having a reflecting surface coated on the micromirrors. A thickness $\lambda/8$ of material 110 is sufficient to introduce a phase delay of 90 degrees between the light beams reflected from the coated and uncoated mirrors.

Figure 12:
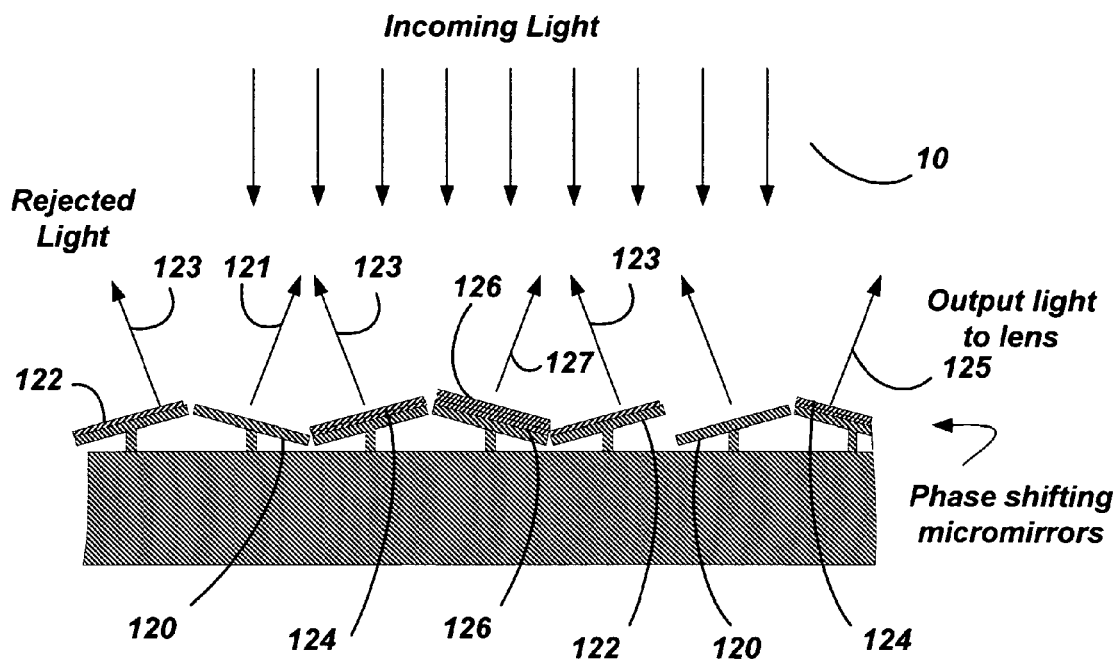
FIG. 12 shows a sketch of the most preferred embodiment of the invention.

FIG. 12 shows the most preferred embodiment of the invention. A micromirror device has mirrors 120 with no coating, mirrors 122 with a layer $\lambda/8$ of reflecting coating material deposited upon the mirror, mirrors 124 with a layer $\lambda/4$ of reflecting material deposited, and mirrors 126 with a layer $3\lambda/8$ of reflecting material deposited. Interspersed light beams 121, 123, 125, and 127 reflected from each of these mirrors are generated, each with a fixed phase difference approximately 0, 90, 180, or 270 degrees from each of the other light beams. Each of the light beams are modulated (in this case, turned on or off) by tilting the mirrors one way or the other.

Figure 13:
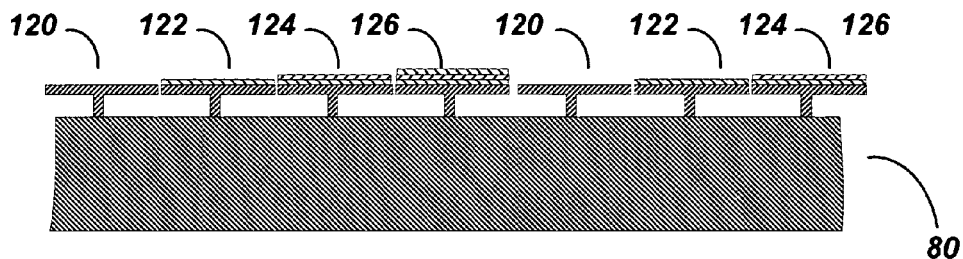
FIG. 13 shows a sketch of a stage of manufacture of the most preferred embodiment of the invention.

FIG. 13 shows the micromirror device in a construction phase, wherein the mirrors are formed on a silicon substrate and are parallel to each other and to the original substrate surface. The structure of FIG. 13 is formed from a standard micromirror part with two lithography steps, and a two depositions of material of thickness $\lambda/8$ and $\lambda/4$ respectively. In this phase of construction, the mirrors lie in one of 4 planes, each plane separated from the next by $\lambda/8$.

Figure 14:
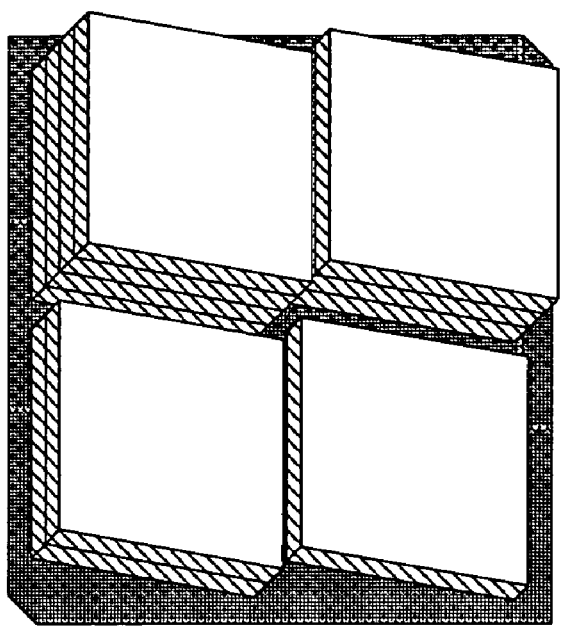
FIG. 14 shows a sketch of an embodiment of the invention.

FIG. 14 shows a sketch of 4 micromirrors, each having a different "plane" of reflectivity. Such a set of micromirrors, acting together, will produce four interspersed light beams, each of which has amplitude zero or one. The four micromirrors of FIG. 14 can be thought of as a single "pixel" with a phase of one of the four primary phases 0, 90, 180, or 270, if one and only one mirror is turned "on". The amplitude of the pixel would be, in this example, 1. If, for example, the 0 and 90 degree mirrors were turned on, the resulting pixel phase would be 45 degrees, and the pixel amplitude would be $2^{1/2}$. Note that the 90 degree mirror and the 270 degree mirror turned on together would cancel each other, and if all four mirrors were turned on, there would be no output for the "pixel". Thus, the possible combination of subsets of the 4 mirrors would give one of eight phases for the pixel, with an amplitude of 1 for the primary phases, and $2^{1/2}$ for the 45, 135, 225, and 315 degree outputs. To get finer control of the amplitude of the light, as well as the phase, more neighboring sets of four mirrors would be needed. The micromirrors of FIG. 14, and neighboring such sets of 4 such mirrors will produce a sufficient number of interspersed light beams to create a resultant light beam with phase and amplitude controlled sufficiently to create holographic images when the beams are gathered and imaged by a lens system or by the lens of a human eye. Although the layers deposited on the micromirrors are shown as distinct layers, clearly the material of each layer may be identical, for example aluminum, and so the mirrors would appear to be uniform but with different thicknesses of aluminum or other reflecting material deposited on the underlying material. If light of a different wavelength than the design wavelength is used, there will still be a significant imaginary component of light transmitted in the interspersed light beams, and by adjusting the transmission of the LCD device 30, both imaginary and real components of the resultant beam can be controlled by appropriate control of the electrodes 38. For example, if the design wavelength $\lambda$ is used, so that the interspersed light beams have phases of 0 degrees and 90 degrees, and a resultant beam with phase 45 degrees is required, the amplitude of the 0 degree beams and the 90 degree beams will be set equal. If, however, a different wavelength is used so that the phases of the component beams are 0 degrees and 80 degrees (for example), the 0 degree beam will be attenuated more by a calculated amount than the 80 degree beam to bring the resultant phase angle to 45 degrees and the amplitude of the electric field to the required amplitude. The apparatus of FIG. 3 is thus suitable for controlling light having wavelength significantly different from the design wavelength $\lambda$, and can indeed be used to provide temporally and spatially varying color holograms by providing sequential color inputs and sequentially changing amplitudes for each of the interspersed beams.

FIG. 15 depicts a layout of a two phase array where the phases are arranged in a random or pseudo random array.

FIG. 16 shows an arrangement for a four phase array, where the phase differences are arranged in alternating left and right hand spirals.

REFERENCES

U.S. Patent Documents:
Hornbeck U.S. Pat. No. 4,566,935 Spatial light modulator and method
Hornbeck U.S. Pat. No. 4,615,595 Frame addressed spatial light modulator
Hornbeck U.S. Pat. No. 4,662,746 Spatial light modulator and method
Hornbeck U.S. Pat. No. 5,083,857 Multi-level deformable mirror device
Michalicek, et al. U.S. Pat. No. 6,028,689 Multi-motion micromirror
Michalicek U.S. Pat. No. 6,040,935 Flexureless multi-stable micromirrors for optical switching
Solgaard, et al. U.S. Pat. No. 6,097,859 multiwavelength optical router
Cambonie, et al. U.S. Pat. No. 6,564,236 device (non optical) doing complex transforms
Hendler, et al. U.S. Pat. No. 5,506,676 Defect detection using Fourier optics and a spatial separator for simultaneous optical computing of separated Fourier transform components
Kwong, et al. U.S. Pat. No. 4,762,394 Real time optical computing and image processing using self-pumped conjugate mirror The patent applications, patents, and references referred to herein are hereby included in their entirety, including included references.

The foregoing descriptions of preferred embodiments of the invention have been presented for the purposes of illustration and description. It is not intended to be exhaustive or to limit the invention to the precise form disclosed. Many modifications and variations are possible in the light of the above teaching. It is intended that the scope of the invention be limited not by this detailed description, but rather by the claims appended hereto.

We claim:
1. An apparatus, comprising:
   a means for generating a large plurality of interspersed output light sources from an input light beam of wavelength $\lambda$, at least some of the large plurality of interspersed output light sources having a first one of at least two phases fixed with respect to the phases of each other of the large plurality of interspersed output light sources, and at least some of the large plurality of interspersed output light sources having a second one of the at least two phases; and
   a controller for separately controlling the amplitude of each of the large plurality of interspersed fixed phase output light sources;
   wherein the large plurality of interspersed output light sources produce a large plurality of diffracting output light beams which combine to form an output light beam having amplitudes of real and imaginary parts of the output light beam controlled by the controller in a spatial and time resolved manner over the cross section of the output light beam;

wherein the controller for separately controlling the amplitude of each of the large plurality of interspersed output light beams is an array of micromirrors; and wherein each reflecting surface of each of the micromirrors in a first state is coplanar with either a first plane or a second plane, the first and the second plane spaced a distance apart of approximately $\lambda/8$;

wherein the reflecting surfaces of each micromirror in the first state in one of the two planes are arranged randomly or pseudorandomly in an array.

2. An apparatus, comprising:

a means for generating a large plurality of interspersed output light sources from an input light beam of wavelength $\lambda$, at least some of the large plurality of interspersed output light sources having a first one of at least two phases fixed with respect to the phases of each other of the large plurality of interspersed output light sources, and at least some of the large plurality of interspersed output light sources having a second one of the at least two phases; and a controller for separately controlling the amplitude of each of the large plurality of interspersed fixed phase output light sources;

wherein the large plurality of interspersed output light sources produce a large plurality of diffracting output light beams which combine to form an output light beam having amplitudes of real and imaginary parts of the output light beam controlled by the controller in a spatial and time resolved manner over the cross section of the output light beam; and wherein the controller for separately controlling the amplitude of each of the large plurality of interspersed output light beams is an array of micromirrors;

wherein a patterned layer of transparent material is applied adjacent the array of micromirrors, wherein the patterned layer is patterned to provide one of at least two phase delays for light proceeding to and thence reflected from each micromirror, wherein the phase delays for each micromirror are fixed with respect to the phase delays of each other micromirror.

3. An apparatus, comprising:

a means for generating a large plurality of interspersed output light sources from an input light beam of wavelength $\lambda$, at least some of the large plurality of interspersed output light sources having a first one of at least two phases fixed with respect to the phases of each other of the large plurality of interspersed output light sources, and at least some of the large plurality of interspersed output light sources having a second one of the at least two phases; and a controller for separately controlling the amplitude of each of the large plurality of interspersed fixed phase output light sources;

wherein the large plurality of interspersed output light sources produce a large plurality of diffracting output light beams which combine to form an output light beam having amplitudes of real and imaginary parts of the output light beam controlled by the controller in a spatial and time resolved manner over the cross section of the output light beam:

wherein the controller for separately controlling the amplitude of each of the large plurality of interspersed output light beams is an array of micromirrors; and wherein the controller for separately controlling and the means for generating are separately located on at least two different devices.

4. The apparatus of claim 3, wherein the controller for separately controlling is an array of micromirrors.

5. The apparatus of claim 4, wherein a patterned layer is attached to a device separated from the array of micromirrors, and wherein the patterned layer spatially separates light incident on the patterned layer into a large plurality of interspersed output light beams, each of the interspersed output light beams having one of at least two phases fixed with respect to the phases of each of the other interspersed output light beams, and wherein an optical system focuses each of the interspersed light beams on to a separate micromirror, and wherein each micromirror modulates the amplitude of each of the interspersed light beams reflected from the micromirror.

6. The apparatus of claim 5, wherein the patterned layer spatially separates light incident on the patterned layer into a large plurality of interspersed light beams, each of the interspersed light beams having one of four phases fixed with respect to the phases of each of the other interspersed light beams, the four phases differing in phase by one of approximately 90°, 180° or 270°.

7. The apparatus of claim 4, wherein a patterned layer is attached to a device separated from the array of micromirrors, and wherein each micromirror modulates the amplitude of each interspersed output light beam reflected from the micromirror, and wherein an optical system focuses each of the interspersed output light beams on to the patterned layer, wherein the interspersed light beams have phases controlled by the patterned layer so that each of the interspersed light beams has one of at least two phases fixed with respect to the phases of each of the other interspersed light beams.

8. The apparatus of claim 7, wherein the patterned layer spatially separates light incident on the patterned layer into a large plurality of interspersed output light beams, each of the interspersed output light beams having one of four phases fixed with respect to the phases of each of the other interspersed output light beams, the four phases differing in phase by one of approximately 90°, 180° or 270°.

9. An apparatus, comprising:

an array of separately controllable micromirrors for separately controlling the amplitude of real and imaginary parts of a diffracted output light beam of wavelength $\lambda$, wherein approximately equal numbers of micromirrors of the array have a reflecting surface in a first state coplanar with one of four parallel planes, the four parallel planes spaced a distance approximately $\lambda/8$ apart, wherein the reflecting surfaces of each micromirror in the first state in one of the two planes are arranged randomly or pseudorandomly in an array.

10. The apparatus of claim 9, wherein the separately controlled amplitude is either zero or one.

* * * * *